US010384866B2

(12) United States Patent
Joosten et al.

(10) Patent No.: US 10,384,866 B2
(45) Date of Patent: Aug. 20, 2019

(54) FLOATING ROOF MONITORING WITH LASER DISTANCE MEASUREMENT

(71) Applicant: Honeywell International Inc., Morristown, NJ (US)

(72) Inventors: John Joosten, Liempde (NL); Ard van Schie, Honselersdijk (NL); Frank van Bekkum, Bergschenhoek (NL)

(73) Assignee: Honeywell International Inc., Morris Plains, NJ (US)

( * ) Notice: Subject to any disclaimer, the term of this patent is extended or adjusted under 35 U.S.C. 154(b) by 497 days.

(21) Appl. No.: 14/615,698

(22) Filed: Feb. 6, 2015

(65) Prior Publication Data
US 2016/0229627 A1 Aug. 11, 2016

(51) Int. Cl.
*B65D 90/48* (2006.01)
*G01F 23/284* (2006.01)
*G01F 23/292* (2006.01)
*B65D 88/34* (2006.01)
*B65D 90/22* (2006.01)

(52) U.S. Cl.
CPC ............ *B65D 90/48* (2013.01); *B65D 88/34* (2013.01); *G01F 23/284* (2013.01); *G01F 23/292* (2013.01); *B65D 90/22* (2013.01); *B65D 2590/0083* (2013.01)

(58) Field of Classification Search
None
See application file for complete search history.

(56) References Cited

U.S. PATENT DOCUMENTS

| 2,717,517 | A | | 9/1955 | Quist | |
|---|---|---|---|---|---|
| 5,036,995 | A | * | 8/1991 | Wagoner | B65D 88/42 220/216 |
| 5,257,090 | A | * | 10/1993 | Meinzer | G01F 23/292 250/205 |

(Continued)

FOREIGN PATENT DOCUMENTS

| EP | 0 996 853 B1 | 10/2008 |
|---|---|---|
| JP | 2003137388 A | 5/2014 |

(Continued)

OTHER PUBLICATIONS

Extended European Search Report for 16154137.0 dated Jul. 21, 2016.

*Primary Examiner* — Benjamin P Sandvik
*Assistant Examiner* — Herve-Louis Y Assouman
(74) *Attorney, Agent, or Firm* — Loza & Loza LLP; Kermit D. Lopez; Luis M. Oritz

(57) ABSTRACT

A floating roof monitoring system and method. One or more sensors can be disposed atop a liquid storage tank having a floating roof covering liquid stored in the liquid storage tank. Each laser sensor measures the distance between the sensor and the floating roof. One or more liquid level gauges can be deployed, which measure a liquid position of the liquid stored in the liquid storage tank. A computing system communicates electronically with the laser sensor(s) and the liquid level gauge(s) to calculate the difference between the liquid position and the distance between the sensor(s) and the floating roof to determine the exact position of the floating roof and activate an alarm or force a process associated with the liquid storage tank to halt.

17 Claims, 7 Drawing Sheets

(56) References Cited

U.S. PATENT DOCUMENTS

| | | | |
|---|---|---|---|
| 5,614,831 A * | 3/1997 | Edvardsson | G01F 23/284 324/642 |
| 8,640,907 B1 | 2/2014 | Herrmann | |
| 8,717,579 B2 | 5/2014 | Portegys | |
| 8,746,482 B2 | 6/2014 | Ben Afeef | |
| 8,776,596 B2 | 7/2014 | Tzonev et al. | |
| 8,820,182 B2 | 9/2014 | Nikolay Nikolov et al. | |
| 2004/0036859 A1 | 2/2004 | Silverman et al. | |
| 2007/0085028 A1 * | 4/2007 | Waibel | G01C 9/00 250/491.1 |
| 2007/0205907 A1 * | 9/2007 | Schenk, Jr. | G01F 23/0015 340/623 |
| 2010/0064534 A1 * | 3/2010 | Schumacher | G01C 15/004 33/228 |
| 2013/0120155 A1 * | 5/2013 | Hagg | G01F 23/00 340/870.01 |
| 2013/0327773 A1 | 12/2013 | Rosenkrantz | |
| 2014/0111642 A1 | 4/2014 | Tzonev et al. | |
| 2014/0231431 A1 | 8/2014 | Rosenkrantz | |
| 2014/0298902 A1 * | 10/2014 | Fannin | G01F 23/2961 73/290 V |

FOREIGN PATENT DOCUMENTS

| | | | | |
|---|---|---|---|---|
| WO | 2008010702 A1 | 1/2008 | | |
| WO | WO 2008/010702 A1 | 1/2008 | | |
| WO | WO2008010702 | * | 1/2008 | |
| WO | WO 2008010702 A1 * | 1/2008 | | B65D 88/08 |
| WO | 2009121169 A1 | 10/2009 | | |
| WO | WO 2013/070131 A1 | 5/2013 | | |

* cited by examiner

FLOATING ROOF MONITORING WITH LASER DISTANCE MEASUREMENT

TECHNICAL FIELD

Embodiments are related to floating roof tanks. Embodiments further relate to systems and methods for monitoring the floating roof of a floating roof tank.

BACKGROUND OF THE INVENTION

In large (e.g., bulk storage) liquid tanks, and in particular tanks used to store hydrocarbons and other chemicals, at refineries, tank terminals, and the like, which are capable of holding large amounts of 'oil' products, use is frequently made of a floating roof, which floats on the liquid in the tank and is displaceable in a vertical direction. Such a floating roof is capable of following the level of a liquid (e.g., hydrocarbons) when the liquid is discharged from or filled into the tank. Floating roofs of this type are used for reducing evaporative losses (from a financial perspective) and also for preventing environmental contamination (e.g., in the USA-EPA regulations (so called Title V)). Such roofs are also employed to reduce explosion risks, and for other reasons, such as preventing ingress of, for example, rainwater from the surroundings into the liquid (e.g., in so called external floating roof tanks).

Typically, the prevention of evaporative losses (e.g., leakage) and ingress is enhanced by a sealing arrangement fitted along a perimeter of the floating roof for providing sealing and sliding contact with an inner wall of the tank. Further, using a roof that floats on the liquid enables minimizing the space between the liquid and the roof and thereby minimizing the amount of flammable gases in this space. In case of fuel and oil tanks, the environment on top of the floating roof is a hazardous or potentially hazardous environment.

Over the last several decades, severe accidents have occurred due to overfill of huge storage (e.g., oil, petroleum products, etc.) tanks (e.g., Buncefield accident in 2005 in the United Kingdom, and in Puerto Rico and Rajastan in 2009). Such accidents sometimes cause injuries, fatalities, and result in high costs to the company owning or managing the facilities where the storage tanks are located. Also, the company image is negatively affected. The impact on the environment can be enormous.

One of the reasons for such accidents is often due to the lack of an adequate overfill protection that is capable of detecting a high tank fill. Current protection systems are based on mechanical devices and are subject to failures and nuisance trips. Most of the systems also are designed for monitoring the liquid level only. Monitoring a floating roof has different requirements and poses different challenges.

Additionally, 30-40% of all storage tanks worldwide are equipped with a floating roof. The purpose of this floating roof is to reduce vapor emissions, both for environmental reasons (less volatile pollutions) and safety (reduction of explosion hazard), but also limiting loss of product. There is an international trend to provide all fixed roof storing lighter hydrocarbons with this type of floating roofs.

There are several concerns related to floating roofs. First, such roofs can become stuck, which might cause damage to the roof/tank, or in a worst case cause the roof to collapse and sink. Second, the roof may make it difficult to sense high alarm conditions and increase the risk of overfill. Either case is very costly to remediate and may also impose fines.

A high accuracy in roof position measurement may also allow for an increased accuracy of tank inventory assessment and better detection of roof landing (e.g., when the roof rests on the bottom), which can help to reduce (e.g., environmental fines) while optimizing storage capacity. High accuracy of this type is also helpful in detecting when the roof doesn't properly follow the liquid, hence provide a pre-warning before the roof becomes stuck. Also, the earlier discussed (rim) seal causes friction, which affects the immersion of the floating roof. A different immersion means that a different amount of liquid is displaced by the roof. By measuring the immersion—at one or preferably more locations, the immersion correction on the assessed tank inventory (mass or volume) can be improved.

A current solution uses radar gauges, which are disadvantageous because their measurements are unreliable as there are typically obstructions on the floating roof (e.g., which cause unwanted reflections). A highly accurate determination is difficult to obtain when measuring close to the tank wall, and measuring further away increases the installation complexity and costs.

High levels of detection of floating roofs are still mostly accomplished using 'conventional' mechanical switches, which are maintenance dependent and typically not subject to self-testing.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for a system and method for floating roof monitoring.

It is another aspect of the disclosed embodiments to provide a system and method for floating roof monitoring using one or more laser distance measurement devices.

It is yet another aspect of the disclosed embodiments to provide a system and method for floating roof monitoring using laser distance measurement in association with measurement data obtained from a liquid level gauge to observe the exact behavior of the floating roof and take preventive or predictive action.

The aforementioned aspects and other objectives and advantages can now be achieved as described herein. A floating roof monitoring system is disclosed. One or more sensors can be disposed atop a liquid storage tank having a floating roof covering liquid stored in the liquid storage tank. Each laser sensor measures the distance between the sensor and the floating roof. One or more liquid level gauges can be deployed, which measures a liquid position of the liquid stored in the liquid storage tank. A computing system communicates electronically with the laser sensor(s) and the liquid level gauge(s) to calculate the difference between the liquid position and the distance between the sensor(s) and the floating roof to determine the exact position of the floating roof and activate an alarm or force a process associated with the liquid storage tank to halt.

Note that for a simple installation, the laser devices can also be equipped with electronic spirit levels (e.g., such as found in tablet computing devices and/or smartphones) measuring the tilt and electronically correcting the vertical level measurement. In this way it becomes less critical that the laser sensor is installed exactly plumb.

Each of the laser sensors can be installed at an approximately 120 degree (e.g., with 3 sensors or, 180 with two sensors, etc.) angle on top of the liquid tank to measure the distance between the sensors) and the floating roof. Resulting measurement data can be transmitted to a central device or computing system that calculates the exact position and depending on the application generates an alarm or forces a process associated with the floating roof and/or storage tank stop. The communication can also be routed via the radar gauge—this allows to reduce cabling and infrastructure.

Information from the installed level gauge can be utilized to calculate the difference in roof position compared to liquid position. For example, when a roof is moving up too high (e.g., overfill protection limit), an alarm can be generated or a process stop is forced. The laser sensors can be used to observe the exact behavior of the floating roof. For example, if the roof "hicks", a conclusion about the friction between the roof and the tank shell can be monitored and analyzed over time (e.g., preventive/predictive maintenance). The laser sensors can also be utilized to observe tilt and contribute to 'learning', i.e., where maintenance information is provided (e.g., if an excessive lagging is observed at specific levels). Other types of information that can be gleaned with the use of such laser sensors include, for example, environmental effects (e.g., not draining rain water, snow loading, excessive wind loading, and even during earthquakes when 'sloshing' can occur). Other uses of the disclosed approach include detecting excessive fire water on the floating roof, which is pumped during tank farm fires on neighboring tanks.

Unique to the disclosed embodiments is the use of a group of laser distance measurement devices (e.g., three laser sensors) that measure distance and compare this information with liquid level measurement data. All such measurements are independent, allow for the exact detecting of the position of a floating roof, and will improve safety at lower costs than available at the moment with better performance and reliability and installation cost.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

Figure 1:
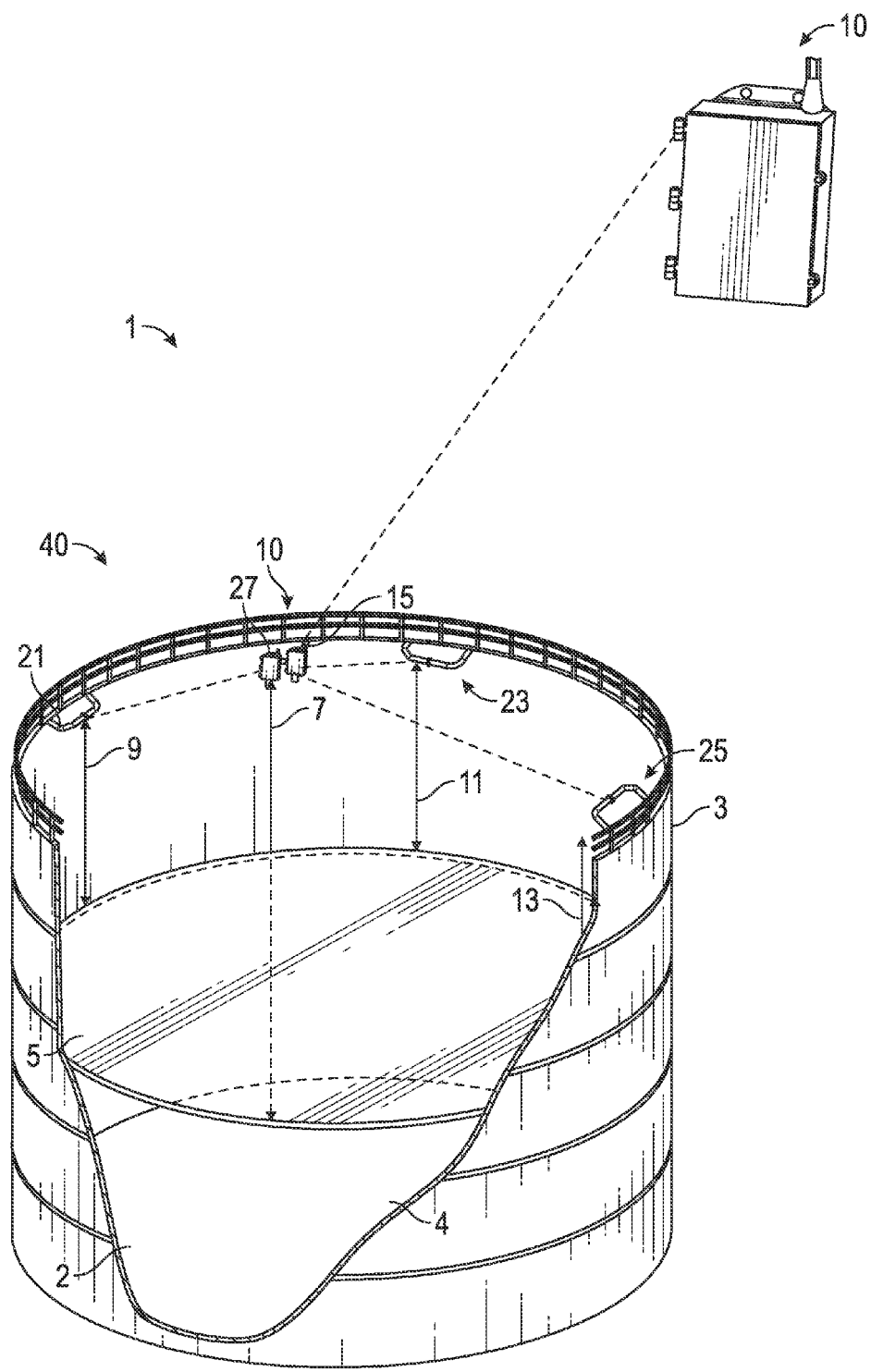
FIG. 1 illustrates a schematic diagram of a floating roof monitoring system, which incorporates laser distance measurement, in accordance with a preferred embodiment.

FIG. 1 illustrates a schematic diagram of a floating roof monitoring system 40, which incorporates laser distance measurement, in accordance with a preferred embodiment. The floating roof monitoring system 40 can be applied to a floating roof tank 1 having a bottom 2 and a side wall 3. The tank 1 is typically configured from steel and has a diameter of several tens of meters. In the scenario shown in FIG. 1, the tank contains liquid 4 on top of which a floating roof 5 floats by means of floats (not shown) integrated with the floating roof 5. The floating roof 5 has a seal (not shown) along its perimeter for limiting the passage of liquid and gas between the floating roof 5 and an inside of the side wall 3. The floating roof tank 1 and its associated equipment may further include pipe attachments, pipes, valves, actuators for filling and discharging the oil, and various measuring and control devices, et cetera. Typically, the liquid and/or gas maintained within the tank 1 are hydrocarbon products ranging from, for example, Asphalts and Bitumen to naphtha (base for gasoline) gasoline, diesel, kerosene (as jet fuel), fuel oils, lubricants, and many chemicals such as industrial solvents.

The floating roof monitoring system 40 shown in FIG. 1 can include one or more laser sensors 21, 23, and 25 disposed atop a liquid storage tank 1 having a floating roof 5 covering liquid 4 stored in the liquid storage tank. Note that in the scenario shown in FIG. 1, the laser sensors 21, 23, 25 are shown as located on the tank 1. It can be appreciated, however, that the laser sensors 21, 23, 25 can be located in other locations, such as on the floating roof 5 as shown in the alternative embodiment of FIG. 3.

The laser sensors 21, 23, and 25 measure the distance between each sensor 21, 23, and 25 and the floating roof 5. One or more liquid level gauges such as liquid level gauge 27 can be employed with respect to the liquid 4 to measure the liquid position or level of the liquid 4 (e.g., oil) stored in the liquid storage tank 1. Note that although three laser sensors 21, 23, and 25 are shown in the embodiment of FIG. 1, fewer or more laser sensors may be deployed in the context of system 40. Note that lines 9, 11, and 13 indicate the vertical position of the floating roof 5 with respect to sensors 21, 23, and 25. Hence, distance is measured from where the laser sensor is installed down to the floating roof 5. Line 7 indicates the path of level gauge 27 with respect to the liquid or gas maintained by the floating roof 5.

A computing system 10 can communicate via wireless and/or wired communications with each of the laser sensors 21, 23, and 25 and also the liquid level gauge 27 to calculate the difference between the liquid position and the distance between the laser sensors 21, 23, and 25 and the floating roof 5 to determine the exact position of the floating roof 5 and activate an alarm (not shown in FIG. 1) or force a process associated with the liquid storage tank 1 to halt. Each of the laser sensors 21, 23, 25 is preferably disposed at a 120° angle atop and with respect to the floating roof 5. The computing system 10 in this manner can determine when the roof is moving up too high (e.g., overfill protection limit).

Note that the amount of sensors employed depends on the type of roof (e.g., some are more flexible) and also on the size and the justification (e.g., cost-risk balance). The present inventors have found that three sensors seem to be optimal. It can be appreciated, however, that more than three sensors may be employed depending on the situation. For example, in some cases such floating roofs are very flexible (i.e., they simply fold when the get stuck and fail) or may be relatively stiff. If a roof fails, this may be due to an excessive amount of liquid on one side, which leads to the roof sinking.

In the embodiment shown in FIG. 1, the computing system 10 can be composed of one or more computing devices and monitoring equipment. In order for the system 10 to communicate the local level, position, and measurement values or overall status of the floating roof, the system can be implemented as part of an off-roof subsystem, a radio communication off-roof circuitry 15 arranged to communicate wirelessly with at least one of the laser sensors 21, 23, and 25 and arranged to convey measurement data and/or status information to the computing system 10, which can function as part of a higher level control system, typically reachable via a radio gateway and located remotely from the floating roof tank 5, generally in a non-hazardous environment.

The computing system 10 can be configured to analyze variations in time, etc., and also learn how the roof moves up and down. For example, the roof may move much smoother when the tank is filled than when it is emptied, due to different forces acting on the roof (e.g., change in buoyancy is immense when liquid level raises). An internal floating roof (e.g., typically configured from Aluminum) is not too heavy and hence the forces when emptying are limited to the weight. Also, particular problems may arise under special operational conditions (e.g., 'purging' of pipelines can cause roof panes to be blown out). Pipelines, which were empty at the start of transfer, can cause excessive air bubbles when pumping is initiated (e.g., the roof literally moves up inches). Also, special problems can arise during, for example, a rim fire (i.e., a fire in the ring rim between the roof and the tank shell—often caused by lightning). Consequently, the fire retardant (a mix of (blood) protein and water) is then pumped into the rim. Sometimes this happens too fast or too much is pumped in and the liquid moves on the roof, which may then sink.

The liquid level gauge 27 can be deployed to measure a filling level of the liquid 4 relative to a reference point of the tank 1 and, more specifically, often a datum plate of the tank 1. In some embodiments, the liquid level gauge 27 may be installed on top of a still pipe 7 in the form of a pipe arranged vertically from a top of the side wall 3, through an opening in the floating roof 5, and through the liquid 4 towards the bottom 2. The floating roof 5 normally floats generally horizontally on the liquid 4 and follows the liquid level during filling or discharging. However, potentially this normal floating could become faulty in various situations and by various causes as indicated herein.

Determining faulty floating at an early stage is of essence, since a capsizing, sinking, breaking or other resulting fault could then be avoided by appropriate measures. Such measures include halting a filling or discharge of the liquid, re-filling or re-discharging a certain liquid volume, rushed emptying the tank to a liquid level where the floating roof has mechanical support against the bottom, and alerting personnel working in the tank environment.

Note that each of the laser sensors 21, 23, 25 and the liquid level gauge 27 can include the use of intrinsically safe measuring circuitry, which generate electromagnetic signals. Each of the laser sensors 21, 23, 25 can further include intrinsically safe radio communication circuitry coupled to its measuring circuitry and including a communication antenna (not shown) for communicating externally a data indicative of the measurement of the distance between each sensor 21, 23, 25 and the floating roof 5. Each of the sensors 21, 23, 25 and the liquid level gauge 27 can further include the use of intrinsically safe power supply circuitry to receive power via an intrinsically safe power supply circuitry connection interface for powering such components. Each of the sensors 21, 23, 25 and the liquid level gauge 27 can be adapted to receive an intrinsically safe and interchangeable energy storage unit (not shown) having an intrinsically safe energy storage unit connection interface coupled to the power supply circuitry connection interface.

Figure 2:
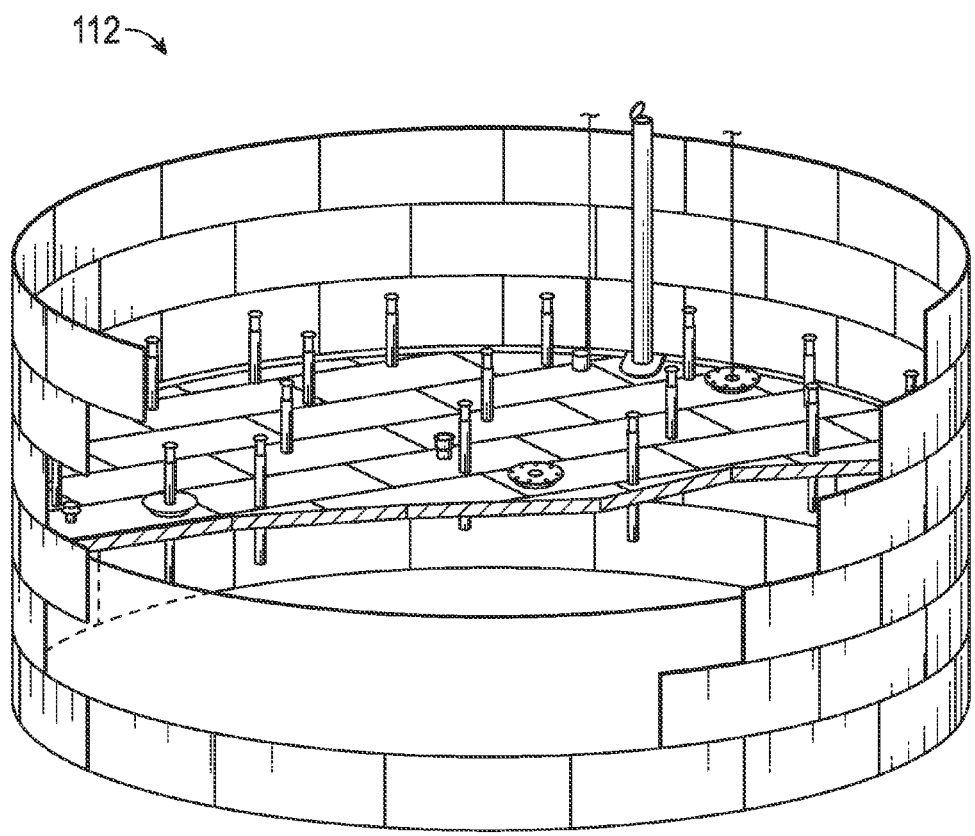
FIG. 2 illustrates a pictorial diagram of an example external floating roof, which may be monitored via the floating roof monitoring system disclosed herein.

FIG. 2 illustrates a pictorial diagram of an example external floating roof configuration 112, which may be monitored via the floating roof monitoring system disclosed herein. In the configuration shown in FIG. 2, an open top (no fixed roof) scenario is depicted. In the external floating roof configuration 112, a rim seal (mechanical-shoe) is shown, in addition to a rim vent and a vacuum breaker. One or more deck legs are depicted in addition to an overflow drain and an access hatch. A gauge hatch/sample port is also shown in the FIG. 2 configuration along with a solid guidepole, which may be unclotted and a gauge float. The tank shell is also shown in FIG. 2.

Figure 3:
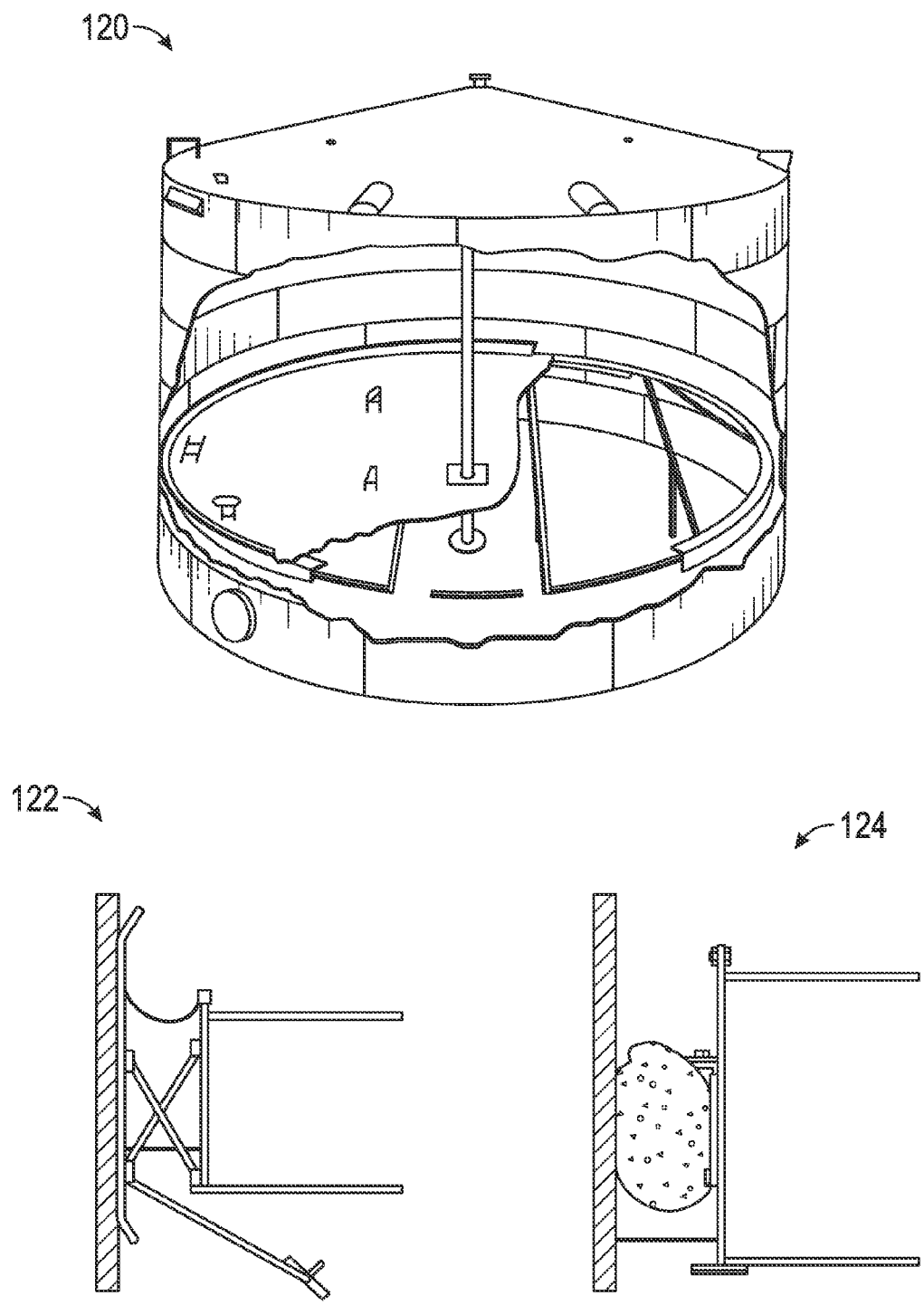
FIG. 3 illustrates a pictorial example of an internal floating roof, which also may be monitored via the floating roof monitoring system disclosed herein.

FIG. 3 illustrates a pictorial example of an internal floating roof configuration 120, which also may be monitored via the floating roof monitoring system disclosed herein. The internal floating roof configuration 120 includes a ground cable roof attachment, a cover access hatch, an anti-rotation roof fitting, and a ground cable. The internal floating roof configuration 120 also includes an anti-rotation cable along with an anti-rotation lug that is welded to the floor. Pontoons are also shown in FIG. 3, along with a tank support column, vacuum breaker and actuator leg, a shell manway, and seals 122 and 124, which are respectively shown as Detail 1 (Shoe Seal) and Detail 2 (Tube Seal).

Figure 4:
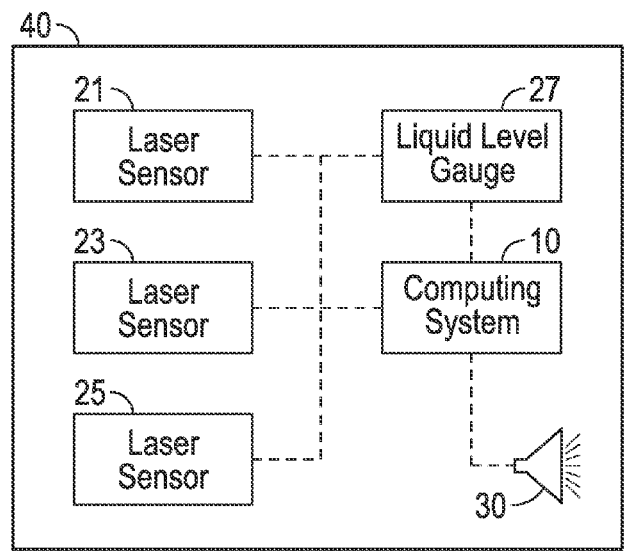
FIG. 4 illustrates a block diagram of the floating roof monitoring system disclosed herein, in accordance with a preferred embodiment.

FIG. 4 illustrates a block diagram of the floating roof monitoring system 40, in accordance with a preferred embodiment. System 40 generally includes one or more laser sensors 21, 23, 25 disposed atop the floating roof 5 of, for example, the liquid storage tank 1 shown in FIG. 1 and/or in association with the floating roof configurations shown, for example, in FIGS. 2-3. Note that in some embodiments the laser sensors 21, 23, 25 may be disposed on the tank itself (e.g., FIG. 1) or on the floating roof 5. In either case, the laser sensors 21, 23, 25 can be deployed to measure the distance between the sensors 21, 23, 25 and the floating roof 5. System 40 further includes the use of one or more liquid level gauge(s) 27 to measure the liquid position of the liquid 4 stored in the liquid storage tank 1. Finally, system 40 includes a computing system 10 that communicates electronically with laser sensors 21, 23, 25 and the liquid level gauge 27 (or gauges) and which calculates the difference between the liquid position and the distance between the sensor(s) and the floating roof to determine the exact position of the floating roof and activate an alarm 30 or force a process associated with the liquid storage tank to halt.

The measurement data can be transmitted to the computing system 10 to calculate the exact position of the floating roof 5 and depending on the application, generate an audible alarm via the alarm 30 shown in FIG. 4 and/or force a process associated with the liquid storage tank 1 to stop (e.g., overfill protection limit). Information from the installed gauge 27, for example, can be utilized to calculate the difference in roof position compared to liquid position. The three laser sensors 21, 23, 25 can be used to observe the exact behavior of the floating roof 5. For example, if the roof 5 "hicks," a conclusion about the friction between the roof 5 and the tank 1 can be monitored and analyzed over time (e.g., preventive/predictive maintenance).

It can be appreciated that communication in the context of the floating roof monitoring system 40 can be wired or wireless or a combination of both. Additionally, information from one or more of the sensors 21, 23, 25 can be employed and/or combined for enhanced processing and diagnostics. For example, low reflectivity can be used to detect polluted optics on, for example, a transmitter. If this situation occurs with more than one transmitter simultaneously, this situation is most likely related to an atmospheric condition (e.g., rain, dust, etc.) when the tank is open (i.e., the tank does not have a fixed roof).

Figure 5:
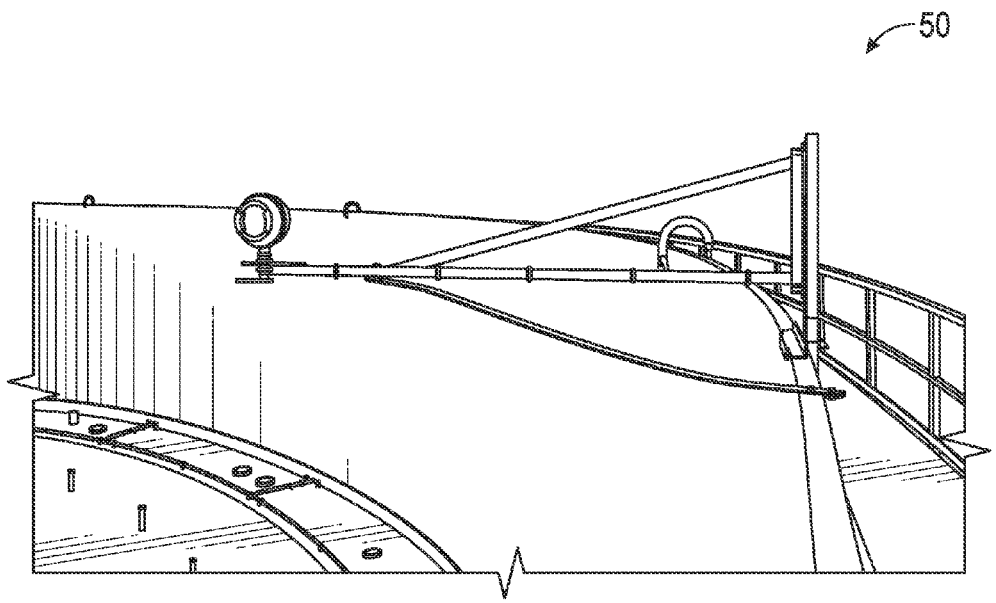
FIG. 5 illustrates a pictorial diagram of a prior art radar configuration demonstrating how far the radar is required to be located from the tank's shell and the difficulty of such an installation.

FIG. 5 illustrates a pictorial diagram of a prior art radar configuration 50 demonstrating how far the radar is required to be located from the tank's shell and the difficulty of such an installation. A laser sensor, on the other hand, may be mounted directly to the wall to illuminate a spot the size of less than a square inch (e.g., a typical radar foot print is 10% of the tank height: i.e., 40 ft tank (which is relatively low)), and offers a reflective area of, for example, 4 ft radius (i.e., where most of the energy is reflected). For good measurement this area should be kept free of obstruction, including the tank shell. Note that a radar reflector is quite cumbersome—several dm's (even up to a foot) may be required for usage. A requirement for optical reflector is much simpler (basically if one can see the red dot, this is quite sufficient). FIG. 5 also illustrates the fact that a floating roof surface can be far from free of objects.

Figure 6:
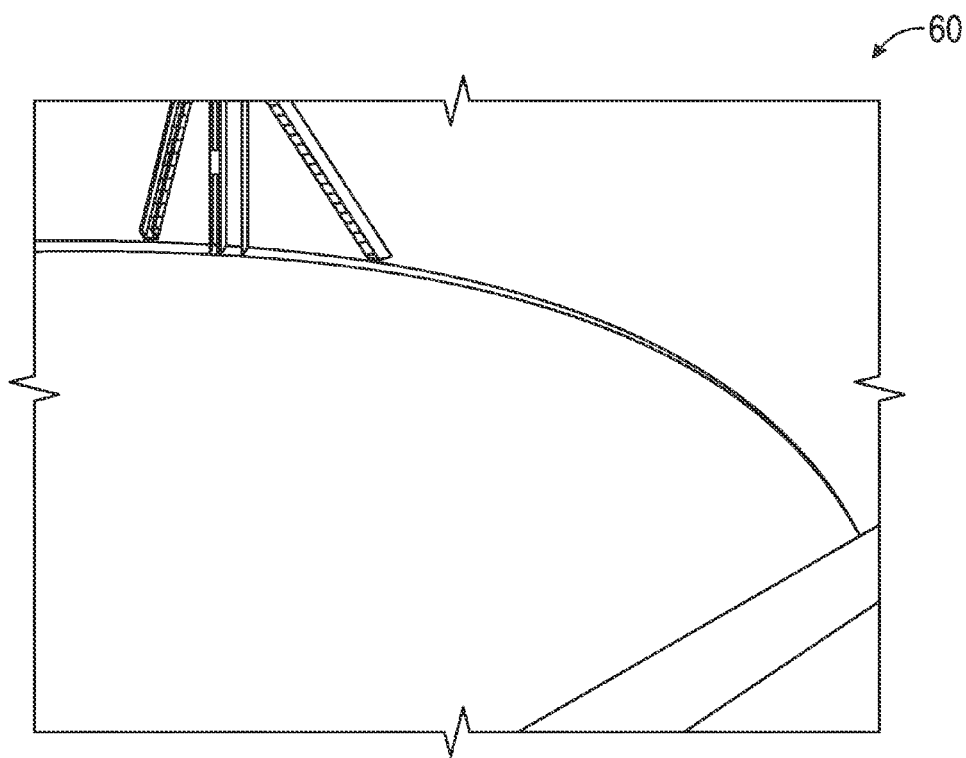
FIG. 6 illustrates a pictorial diagram depicting a sunken floating roof.

FIG. 6 illustrates a pictorial diagram depicting a sunken floating roof 60. The pictorial diagram of FIG. 6 depicts one of the main problems with floating roof configurations. The disclosed embodiments are thus useful in monitoring floating roofs to prevent the situation shown in FIG. 6.

Figure 7:
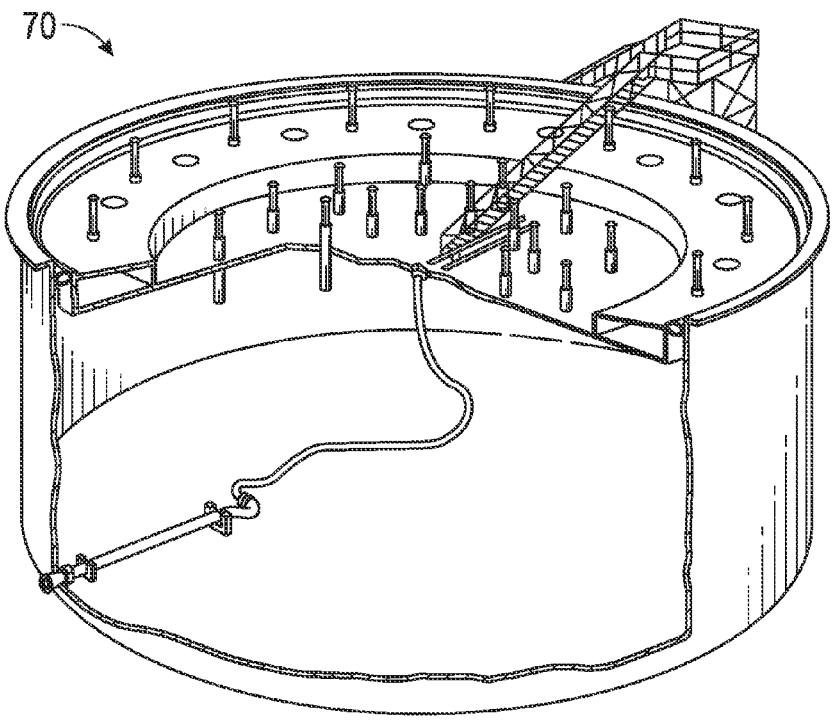
FIG. 7 illustrates an example of an external floating roof tank with a single skin floor with pontoons, which can be monitored by the disclosed floating roof monitoring system, in accordance with an alternative embodiment.

FIG. 7 illustrates an example of an external floating roof tank configuration 70 with a single skin floor with pontoons, which can be monitored by the floating roof monitoring system disclosed herein, in accordance with an alternative embodiment. In the configuration 70 of FIG. 7, a pontoon hatch is depicted along with a leg, a seal, a pontoon, and a drain. The configuration 70 represents another type of floating roof configuration which would benefit from being monitored via the disclosed floating roof monitoring system. The floating roof monitoring system 40, for example, can be adapted to monitor the external floating roof tank configuration 70.

Figure 8:
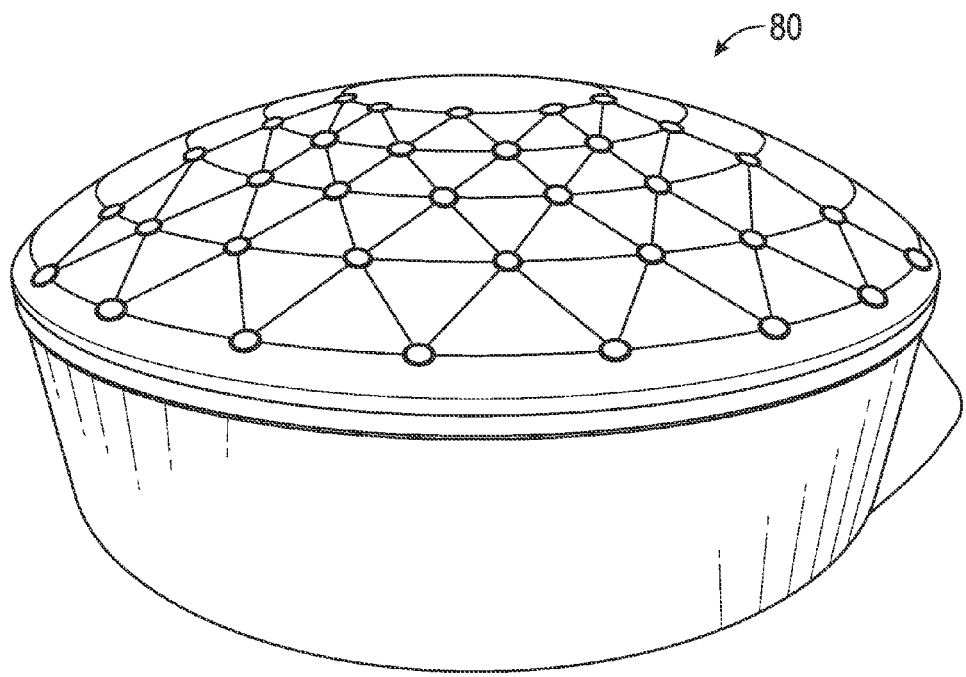
FIG. 8 illustrates an example of a floating roof tank with a geodisc dome configuration, which reduces wind, rain, and possibly snow loading and further reduces evaporative losses, and which may be monitored by the floating roof monitoring system disclosed herein, in accordance with an alternative embodiment.

FIG. 8 illustrates an example of a floating roof tank 80 with a geodisc dome configuration, which reduces wind, rain, and possibly snow loading and further reduces evaporative losses, and which also may be monitored by the floating roof monitoring system disclosed herein, in accordance with an alternative embodiment. The floating roof monitoring system 40 of FIG. 4, for example, can be employed to monitor the floating roof tank 80.

Figure 9:
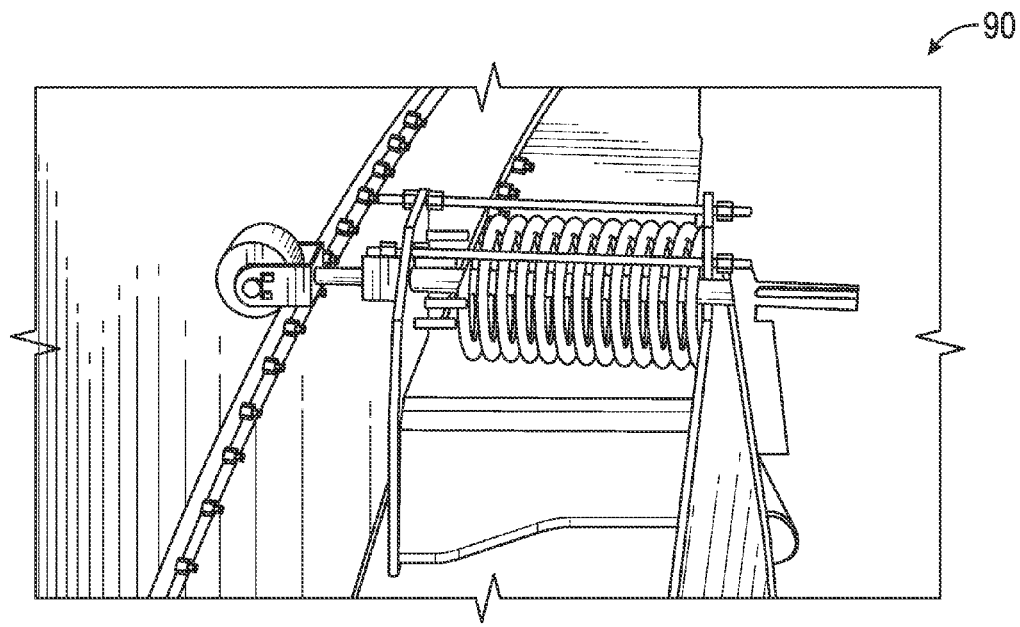
FIG. 9 illustrates an example of a spring loader, which may be employed to keep a floating roof centered and to reduce the risk of the roof becoming stuck.

FIG. 9 illustrates an example of a spring loader 90, which may be employed to keep a floating roof centered and to reduce the risk of the roof becoming stuck.

Figure 10:
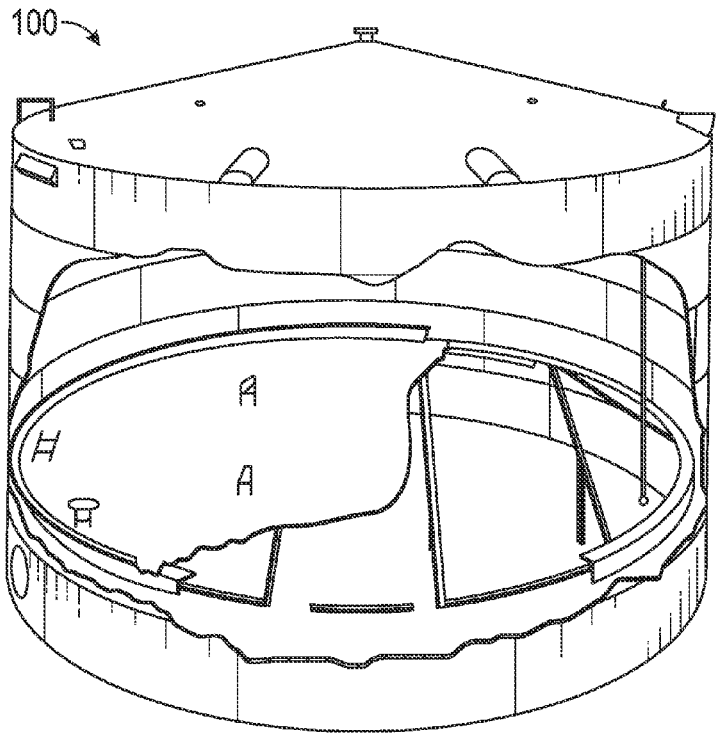
FIG. 10 illustrates an example of an internal floating roof in a fixed roof tank, which can be monitored by the disclosed floating roof monitoring system, in accordance with an alternative embodiment.

FIG. 10 illustrates an example of an internal floating roof in a fixed roof tank 100, which can be monitored by the disclosed floating roof monitoring system, in accordance with an alternative embodiment. The fixed roof tank 100 includes, for example, a center vent and a ground cable roof attachment. An automatic tank gauge piping is included along with a "step on thief hatch" located over a sample well. An optional overflow vent can be included along with one or more ground cables. An automatic gauge float wall may also be employed with the fixed roof tank 100, along with a sample well, a shell manway, an ultraseal, a rim plate, and rim pontoons. The fixed roof tank 100 further includes a vacuum breaker, an actuator leg, and a cover access hatch. An anti-rotation lug is welded to the floor. Rim portions are also shown in FIG. 10 and an anti-rotation cable that passes through a fitting bolted to the rim plate. An anti-rotation roof fitting and peripheral roof vent/inspection hatch can also be incorporated into the fixed roof tank 100. The floating roof monitoring system 40, for example, can be employed to monitor the fixed roof tank 100.

Figure 11:
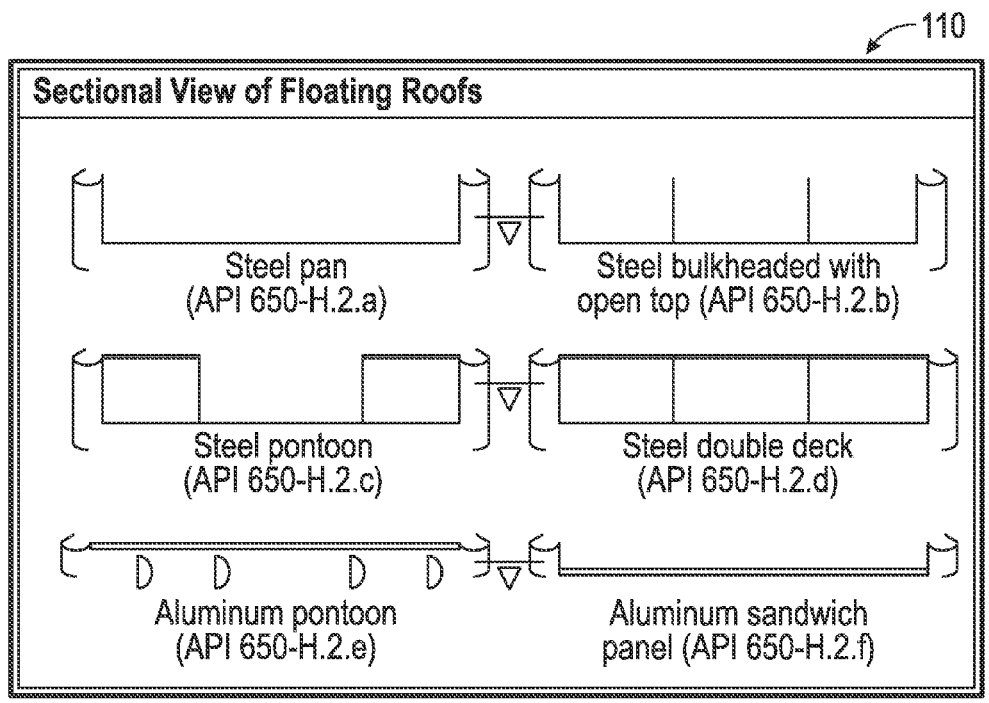
FIG. 11 illustrates sectional views of various floating roofs, which may be monitored by the disclosed floating roof monitoring system.

FIG. 11 illustrates a sectional view 110 of various floating roofs, which may be monitored by the disclosed floating roof monitoring system. Examples of floating roofs shown in FIG. 11 include a steel pan configuration and a steel bulkheaded configuration with an open top. A steel pontoon configuration is also shown in FIG. 11 in addition to a steel double deck configuration. An aluminum pontoon configuration is also depicted in FIG. 11 along with an aluminum sandwich panel arrangement.

Based on the foregoing, it can be appreciated that a number of embodiments, preferred and alternative, are disclosed herein. For example, in a preferred embodiment, a floating roof monitoring system can be implemented that includes one or more laser sensors disposed atop a liquid storage tank having a floating roof covering liquid stored in the liquid storage tank. The laser sensor (or sensors) measures the distance between the sensor(s) and the floating roof. The floating roof monitoring system can further include one or more liquid level gauges that measures the liquid position of the liquid stored in the liquid storage tank. The floating roof monitoring system can further include a computing system that communicates with the laser sensor(s) and the liquid level gauge(s) and which calculates the difference between the liquid position and the distance between the sensor and the floating roof to determine the exact position of the floating roof and activate an alarm or force a process associated with the liquid storage tank to halt.

In another embodiment, the alarm can communicate with the computing system to emit an audible warning. In yet another embodiment, the laser sensor(s) can be composed of three or more laser sensors, which together measure the distance between the laser sensors and the floating roof and provide the distance as data to the computing system, which compares the distance with the liquid position measured by the liquid level gauge (or gauges) to determine the exact position of the floating roof.

In still another embodiment, the laser sensor can be disposed at a 120 angle atop the liquid storage tank having the floating roof covering the liquid stored in the liquid storage tank. In some embodiments, the computing system can communicate wirelessly and/or via wired communications with the one laser sensor(s).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A floating roof monitoring system, comprising:
   at least one laser sensor on a wall of a liquid storage tank having a floating roof, covering liquid stored in said liquid storage tank, wherein said at least one laser sensor measures a distance between said at least one laser sensor and said floating roof, wherein the laser sensor includes intrinsically safe radio communication circuitry;
   at least one optical reflector on said floating roof configured to reflect a signal from said at least one laser sensor back to said at least one laser sensor;
   a spring loader, with the floating roof to keep the floating roof centered;
   at least one electronic spirit level configured on each said at least one laser sensor wherein said electronic spirit level measures a tilt of said at least one laser sensor;
   at least one liquid level gauge that measures a liquid position of said liquid stored in said liquid storage tank; and
   a computing system that communicates with said at least one laser sensor and said at least one liquid level gauge and which calculates a difference between said liquid position and said distance between said at least one sensor and said floating roof to determine an exact position of said floating roof and force a process associated with said liquid storage tank to halt.

2. The system of claim 1 wherein said at least one laser sensor comprises at least three laser sensors, which together provide combined data used to measure said distance between said at least three laser sensors and said floating roof and provide said distance as said combined data to said computing system, which compares said distance with said liquid position measured by said at least one liquid level gauge to determine an exact position of said floating roof.

3. The system of claim 1 wherein said at least one laser sensor comprises at least two laser sensors disposed at a 180 degree angle from one another on said liquid storage tank having said floating roof covering said liquid stored in said liquid storage tank.

4. The system of claim 1 wherein said computing system communicates wirelessly with said at least one laser sensor via said intrinsically safe radio communication circuitry.

5. The system of claim 1 wherein said computing system communicates via wired communication with said at least one laser sensor.

6. The system of claim 1 wherein said computing system communicates via a combination of intrinsically safe radio communication circuitry for wireless communication, and wired communications with said at least one laser sensor.

7. The system of claim 1 wherein said at least one laser sensor comprises at least two laser sensors, which together measure said distance between said at least two laser sensors and said floating roof and provide said distance as data to said computing system, which compares said distance with said liquid position measured by said at least one liquid level gauge to determine an exact position of said floating roof and wherein said at least two laser sensors are disposed at a 180 degree angle from one another on said liquid storage tank having said floating roof covering said liquid stored in said liquid storage tank.

8. A floating roof monitoring system, comprising:
   at least one laser sensor on a wall of a liquid storage tank having a floating roof covering liquid stored in said liquid storage tank, wherein said at least one laser sensor measures a distance between said at least one laser sensor and said floating roof, wherein the laser sensor includes intrinsically safe radio communication circuitry;
   at least one optical reflector on said floating roof configured to reflect a signal from said at least one laser sensor back to said at least one laser sensor;
   a spring loader, with the floating roof to keep the floating roof centered;
   at least one electronic spirit level configured on each said at least one laser sensor wherein said electronic spirit level measures a tilt of said at least one laser sensor;
   at least one liquid level gauge that measures a liquid position of said liquid stored in said liquid storage tank; and
   a computing system that communicates with said at least one laser sensor and said at least one liquid level gauge and which calculates a difference between said liquid position and said distance between said at least one sensor and said floating roof to determine an exact position of said floating roof and force a process associated with said liquid storage tank to halt, wherein said at least one laser sensor comprises at least two laser sensors disposed at a 180 degree angle from one another on said liquid storage tank having said floating roof covering said liquid stored in said liquid storage tank.

9. The system of claim 8 wherein said at least one laser sensor comprises at least three laser sensors, which together provide combined data used to measure said distance between said at least three laser sensors and said floating roof and provide said distance as said combined data to said computing system, which compares said distance with said liquid position measured by said at least one liquid level gauge to determine an exact position of said floating roof.

10. The system of claim 8 wherein said computing system communicates wirelessly with said at least one laser sensor via said intrinsically safe radio communication circuitry.

11. The system of claim 8 wherein said computing system communicates via wired communication with said at least one laser sensor.

12. The system of claim 8 wherein said computing system communicates via a combination of intrinsically safe radio communication circuitry for wireless communication, and wired communications with said at least one laser sensor.

13. A method of monitoring a floating roof, said method comprising:
   disposing at least one laser sensor on a wall of a liquid storage tank having a floating roof covering liquid stored in said liquid storage tank, wherein said at least one laser sensor measures a distance between said at least one laser sensor and said floating roof, wherein the laser sensor includes intrinsically safe radio communication circuitry;
   reflecting a laser signal from said at least one laser sensor with an optical reflector configured on said floating roof back to said at least one laser sensor;
   a spring loader, with the floating roof to keep the floating roof centered;
   measuring a tilt of said at least one laser sensor with at least one electronic spirit level, configured on each said at least one laser sensor;
   employing at least one liquid level gauge to measure a liquid position of said liquid stored in said liquid storage tank; and
   enabling communications between a computing system and said at least one laser sensor and said at least one liquid level gauge so as to calculate a difference between said liquid position and said distance between said at least one sensor and said floating roof to determine an exact position of said floating roof and force a process associated with said liquid storage tank to halt.

14. The method of claim 13 wherein said at least one laser sensor comprises at least three laser sensors, which together provide combined data used to measure said distance between said at least three laser sensors and said floating roof and provide said distance as said combined data to said computing system, which compares said distance with said liquid position measured by said at least one liquid level gauge to determine an exact position of said floating roof.

15. The method of claim 13 further comprising disposing said at least one laser sensor at a 180 angle from at least one other laser sensor on said liquid storage tank having said floating roof covering said liquid stored in said liquid storage tank.

16. The method of claim 13 wherein said computing system communicates wirelessly with said at least one laser sensor via an intrinsically safe radio communication circuitry.

17. The method of claim 13 wherein said computing system communicates via wired communication with said at least one laser sensor.

* * * * *